United States Patent
Chen et al.

(10) Patent No.: US 10,110,325 B2
(45) Date of Patent: Oct. 23, 2018

(54) RF TESTING SYSTEM

(71) Applicant: MediaTek Inc., Hsin-Chu (TW)

(72) Inventors: Yen-Liang Chen, Taipei (TW);
Chun-Hsien Peng, Xinyi Township, Nantou County (TW); Ying-Chou Shih, Hsinchu (TW); Yu-An Chen, Taoyuan (TW); Chun-Wei Yang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/696,807

(22) Filed: Apr. 27, 2015

(65) Prior Publication Data

US 2015/0229415 A1    Aug. 13, 2015

Related U.S. Application Data

(63) Continuation of application No. 14/054,213, filed on Oct. 15, 2013, and a continuation-in-part of application No. 13/480,969, filed on May 25, 2012, now Pat. No. 9,041,421.

(60) Provisional application No. 61/731,845, filed on Nov. 30, 2012, provisional application No. 61/496,451, filed on Jun. 13, 2011.

(51) Int. Cl.
*H04B 17/00* (2015.01)
*H04B 3/46* (2015.01)
*H04B 17/29* (2015.01)

(52) U.S. Cl.
CPC ........... *H04B 17/0085* (2013.01); *H04B 3/46* (2013.01); *H04B 17/29* (2015.01)

(58) Field of Classification Search
CPC ...... H04W 24/00; H04B 17/0085; H04B 3/46

USPC ............................................ 455/67.14, 67.11
See application file for complete search history.

(56) References Cited

U.S. PATENT DOCUMENTS

| | | | |
|---|---|---|---|
| 6,201,829 B1 | 3/2001 | Schneider | |
| 6,407,566 B1* | 6/2002 | Brunelle | G01R 1/0408 324/756.02 |
| 6,543,034 B1* | 4/2003 | Goff | G01R 31/318357 716/136 |
| 7,184,466 B1 | 2/2007 | Seemann et al. | |
| 7,675,309 B2 | 3/2010 | Wu et al. | |

(Continued)

FOREIGN PATENT DOCUMENTS

| CN | 1354503 A | 6/2002 |
|---|---|---|
| CN | 1805296 A | 7/2006 |

(Continued)

OTHER PUBLICATIONS

Kore, L, et al.; "Multi-Site Test of RF Transceivers on Low-Cost Digital ATE;" International Test Conference; IEEE; 2006; pp. 1-10.

(Continued)

*Primary Examiner* — April G Gonzales
(74) *Attorney, Agent, or Firm* — McClure, Qualey & Rodack, LLP

(57) ABSTRACT

An integrated circuit (IC) is provided. The IC includes an RF transmitter configured to generate an RF signal in response to a command signal from test equipment; an RF receiver configured to generate an evaluation signal according to the RF signal, and report the evaluation signal to the test equipment, so that the test equipment performs a test analysis on the evaluation signal to determine a test result, wherein the test equipment is external to the IC.

24 Claims, 14 Drawing Sheets

(56) References Cited

U.S. PATENT DOCUMENTS

| | | | | |
|---|---|---|---|---|
| 7,679,391 B2* | 3/2010 | Watanabe | ........ | G01R 31/31908 |
| | | | | 324/750.3 |
| 8,358,147 B2* | 1/2013 | Pagani | ............... | G01R 31/3172 |
| | | | | 324/762.02 |
| 8,415,955 B2* | 4/2013 | Devine | ................ | G01R 19/145 |
| | | | | 324/500 |
| 9,000,788 B2* | 4/2015 | Pagani | ............. | G01R 31/31713 |
| | | | | 324/750.3 |
| 2004/0243899 A1 | 12/2004 | Bonneau et al. | | |
| 2005/0079822 A1* | 4/2005 | Boose | ............. | G01R 31/31709 |
| | | | | 455/67.11 |
| 2007/0232240 A1* | 10/2007 | Wu | .................... | G01R 31/3025 |
| | | | | 455/73 |
| 2007/0297537 A1* | 12/2007 | Luce | .................. | H04L 27/0014 |
| | | | | 375/322 |
| 2009/0037132 A1* | 2/2009 | Zhou | ................ | G01R 31/31907 |
| | | | | 702/119 |
| 2009/0153158 A1* | 6/2009 | Dunn | ................. | G01R 31/2822 |
| | | | | 324/762.01 |
| 2009/0201039 A1* | 8/2009 | Wu | .................... | G01R 31/3025 |
| | | | | 324/750.3 |
| 2010/0007366 A1 | 1/2010 | Watanabe et al. | | |
| 2010/0227574 A1* | 9/2010 | Kuenen | .............. | G01R 31/2884 |
| | | | | 455/115.2 |
| 2010/0232489 A1 | 9/2010 | Watkins | | |
| 2012/0126821 A1* | 5/2012 | Forstner | ............. | G01R 31/3187 |
| | | | | 324/537 |
| 2013/0021048 A1* | 1/2013 | Peng | ................. | G01R 31/2822 |
| | | | | 324/750.3 |
| 2014/0187170 A1* | 7/2014 | Forstner | ............. | G01R 31/3187 |
| | | | | 455/67.11 |
| 2016/0041221 A1 | 2/2016 | Forstner | | |

FOREIGN PATENT DOCUMENTS

| | | |
|---|---|---|
| CN | 101304542 A | 11/2008 |
| CN | 101374317 | 2/2009 |
| CN | 101453279 A | 6/2009 |
| CN | 101464491 | 6/2009 |
| CN | 101753227 | 6/2010 |
| CN | 101784904 | 7/2010 |
| CN | 102089669 | 6/2011 |
| CN | 102495353 | 6/2012 |
| CN | 102540052 | 7/2012 |
| CN | 103077731 A | 5/2013 |
| CN | 103376757 A | 10/2013 |
| DE | 102011086818 | 5/2012 |
| JP | 2008151718 | 7/2008 |
| TW | 201038956 | 11/2010 |
| WO | WO 2006/113460 | 10/2006 |
| WO | WO 2010/049853 | 5/2010 |

OTHER PUBLICATIONS

Erdogan, E.S., et al.; "Detailed Characterization of Transceiver Parameters," IEEE Transactions on Very Large Scal Integrating (VLSI) Systems; vol. 18; No. 6; Jun. 2010; pp. 1-11.

Berger, R.W., et al.; "Part IV: Product and Process Control;" The Certified Quality Engineer Handbook; 2008; pp. 209-211.

English language translation of "Part IV: Product and Process Control;" The Certified Quality Engineer Handbook; 2008; pp. 209-211.

* cited by examiner

RF TESTING SYSTEM

CROSS REFERENCE TO RELATED APPLICATIONS

This application is a continuation of pending U.S. patent application Ser. No. 14/054,213, filed on Oct. 15, 2013, which claims the benefit of U.S. Provisional Application No. 61/731,845, filed at Nov. 30, 2012, the entireties of which are incorporated by reference herein. This application is also a continuation-in-part of pending U.S. Ser. No. 13/480,969, filed on May 25, 2012, which claims the benefit of U.S. Provisional Application No. 61/496,451, filed on Jun. 13, 2011, the entireties of which are incorporated by reference herein.

BACKGROUND OF THE INVENTION

Field of the Invention

The present invention relates to semiconductor devices, and in particular to radio frequency (RF) testing systems for semiconductor devices.

Description of the Related Art

Semiconductor devices are manufactured in the form of wafers comprising many thousands of devices. The wafers are diced into dies and packaged into integrated circuits (IC). Each IC has been implemented by integrating more and more digital and analog circuits into a single chip.

Due to the increasing complexity of the testing of integrated RF circuits, to identify the "good" and "bad" ICs during production is a challenging problem for those conducting the wafer-level test or final test. In the traditional testing of RF circuits, what is used is expensive automatic test equipment (ATE), such as UltraFlex or Flex with RF instruments, or equipment used in mixing signals is used for generating an RF test signal (or RF patterns) to a device under test (DUT) and processing RF signals emanating from the DUT, leading to increased cost and time to conduct the tests. Therefore, there is a need for an effective RF test technique for transceivers that can solve the above-mentioned problems.

BRIEF SUMMARY OF THE INVENTION

A detailed description is given in the following embodiments with reference to the accompanying drawings.

In an exemplary embodiment, an integrated circuit (IC) is provided. The IC includes an RF transmitter configured to generate an RF signal in response to a command signal from test equipment; an RF receiver configured to generate an evaluation signal according to the RF signal, and report the evaluation signal to the test equipment, so that the test equipment performs a test analysis on the evaluation signal to determine a test result, wherein the test equipment is external to the IC.

In another exemplary embodiment, an integrated circuit (IC) is provided. The IC includes: an RF transmitter configured to generate an RF signal in response to a command signal from test equipment, and transmits the RF signal to a module circuitry for performing signal conversion by the module circuitry to generate an evaluation signal, wherein the evaluation signal is reported to the test equipment, so that the test equipment performs a test analysis on the evaluation signal to determine a test result, wherein the test equipment and the module circuitry are both external to the IC.

In yet another exemplary embodiment, an integrated circuit (IC) is provided. The IC includes: an RF receiver configured to receives an RF signal from a module circuitry in response to a command signal from test equipment, to generate an evaluation signal according to the received RF signal, and report the evaluation signal to the test equipment, so that the test equipment performs a test analysis on the evaluation signal to determine a test result, wherein the module circuitry and the test equipment are both external to the IC.

In still another exemplary embodiment, test equipment communicating with an integrated circuit (IC) is provided. The test equipment includes: a control port configured to send a command signal to the IC for initiating a RF test process; an input port configured to receive an evaluation signal indicative of an electrical characteristic of an RF signal of the IC, wherein the evaluation signal is a baseband signal; and a test analyzer configured to perform a test analysis on the evaluation signal to determine a test result.

In yet another exemplary embodiment, a radio frequency (RF) testing system is provided. The RF testing system includes: test equipment; a module circuitry; and an integrated circuit (IC) configured to communicate with the module circuitry by an RF signal in response to a command signal from the test equipment, generate an evaluation signal by the RF signal, and report the evaluation signal to the test equipment, so that the test equipment performs a test analysis on the evaluation signal to determine the test result, wherein the module circuitry is external to the IC and the test equipment.

In yet another exemplary embodiment, a radio frequency (RF) testing system is provided. The RF testing system includes: test equipment; a module circuitry; and an integrated circuit (IC) configured to communicate with the module circuitry by an RF signal in response to a command signal from the test equipment, wherein the module circuitry generates an evaluation signal according to the RF signal from the IC, and reports the evaluation signal to the test equipment, so that the test equipment performs a test analysis on the evaluation signal to determine the test result, wherein the module circuitry is external to the IC and the test equipment.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
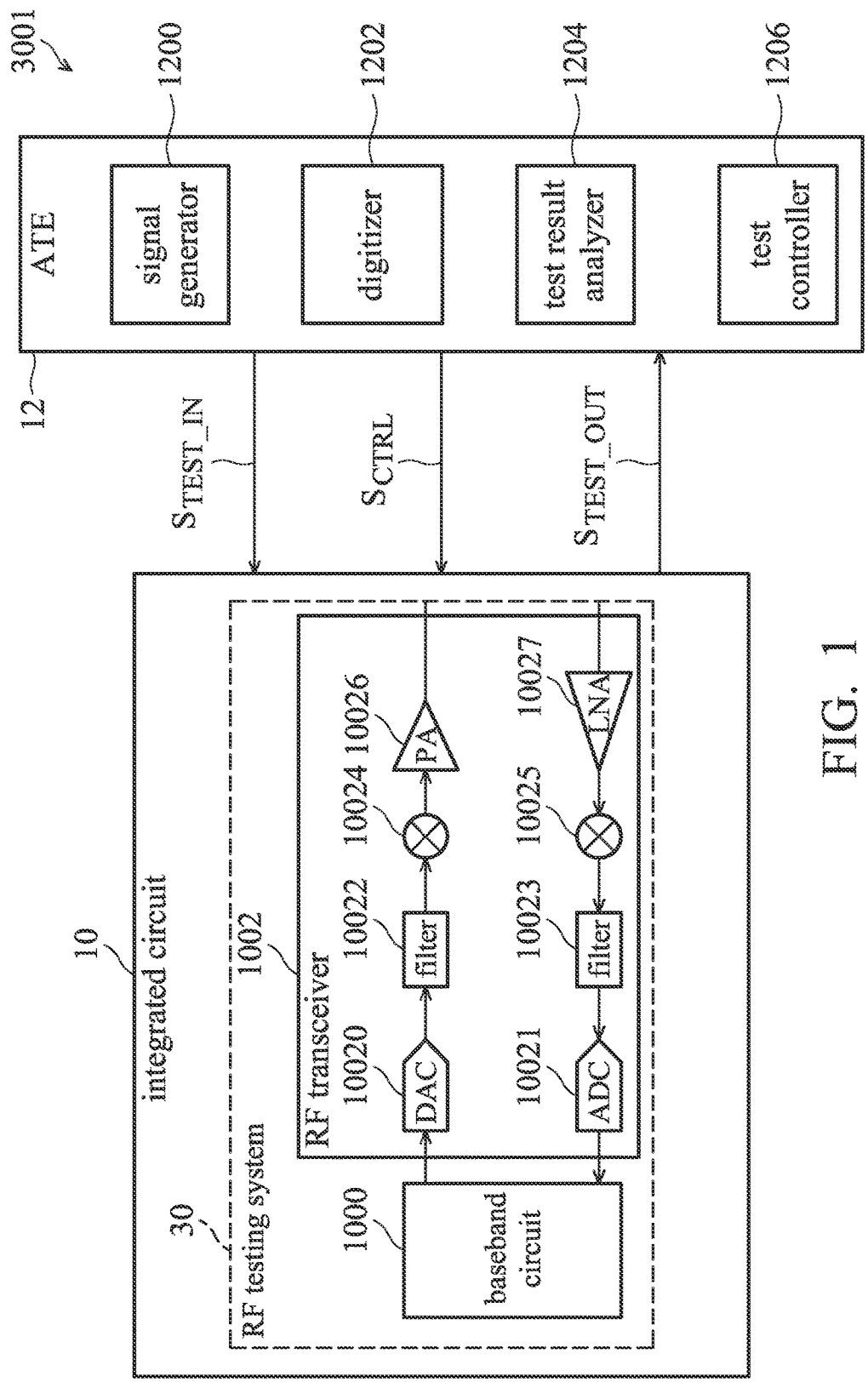
FIG. 1 is a block diagram of a conventional radio frequency (RF) testing system 1.

FIG. 1 is a block diagram of a conventional radio frequency (RF) testing system 3001. As illustrated in FIG. 1, the RF testing system 3001 comprises an integration circuit (IC) 10 and automatic test equipment (ATE) 12. The ATE 12 applies semiconductor testing for digital and analog elements in the IC 10 during the hardware manufacturing procedure. The IC 10 is a device under test (DUT) that receives power and testing patterns from the ATE 12 and outputs testing responses to the ATE 12. The ATE 12 is an electronic apparatus that receives a test program and performs tests accordingly on the DUT by supplying stimulus signals. The ATE 12 also receives outcome signals, takes signal measurements, evaluates test results based on the signal measurements, and determines whether the DUT is good or bad. The ATE 12 comprises a signal generator 1200, a digitizer 1202, a test result analyzer 1204 and a test controller 1206. The test controller 1206 sends a test control signal $S_{CTRL}$ to control all the registers in the IC 10 by some digital or analog pins to operate under a test mode. The signal generator 1200 may provide an analog signal or/and RF signal (test pattern $S_{TEST\_IN}$) to be injected into the IC 10 for the test of RF circuits. The digitizer 1202 digitizes an output response $S_{TEST\_OUT}$ from the IC 10 and converts analog signal or/and RF signal to digital signal. The test result analyzer 1204 analyzes the evaluated signal performance of the digitized signal to determine whether the DUT has any faulty components for the wafer-level test or final test.

The IC 10 in FIG. 1 includes an RF testing system 30, which comprises a baseband circuit 1000 and an RF transceiver 1002. The ATE 12 performs an RF test to the IC 10, particularly to all transceivers for various communication systems adopted by the IC 10 by feeding the analog or/and RF test pattern $S_{TEST\_IN}$ into the IC 10. The RF testing system 30 illustrates a transmitter path and receiver path, wherein the transmitter path comprising a digital-to-analog converter (DAC) 10020, a filter 10022, a modulator 10024, and a power amplifier (PA) 10026, and the receiver path comprising a low noise amplifier (LNA) 10027, a demodulator 10025, a filter 10023, and an analog-to-digital converter (ADC) 10021. For an RF test, the signal generator 1200 in the ATE 12 generates and injects a test pattern $S_{TEST\_IN}$ in high frequency to a testing interface (not shown) for testing the RF receiver in the RF testing system 30. The ATE 12 may further receive analog or/and RF signal $S_{TEST\_OUT}$ from the output of the transmitter path to evaluate the quality of transmitter of the IC 10.

In the conventional RF test, the ATE 12 supplies the analog or/and RF test pattern $S_{TEST\_IN}$ to the IC 10 and receives the analog or/and RF output response $S_{TEST\_OUT}$ from the IC 10, therefore there is high-speed communication between the ATE 12 and the IC 10, requiring the ATE 12 to work at a high speed, resulting in an increased cost of the ATE 12.

Figure 2:
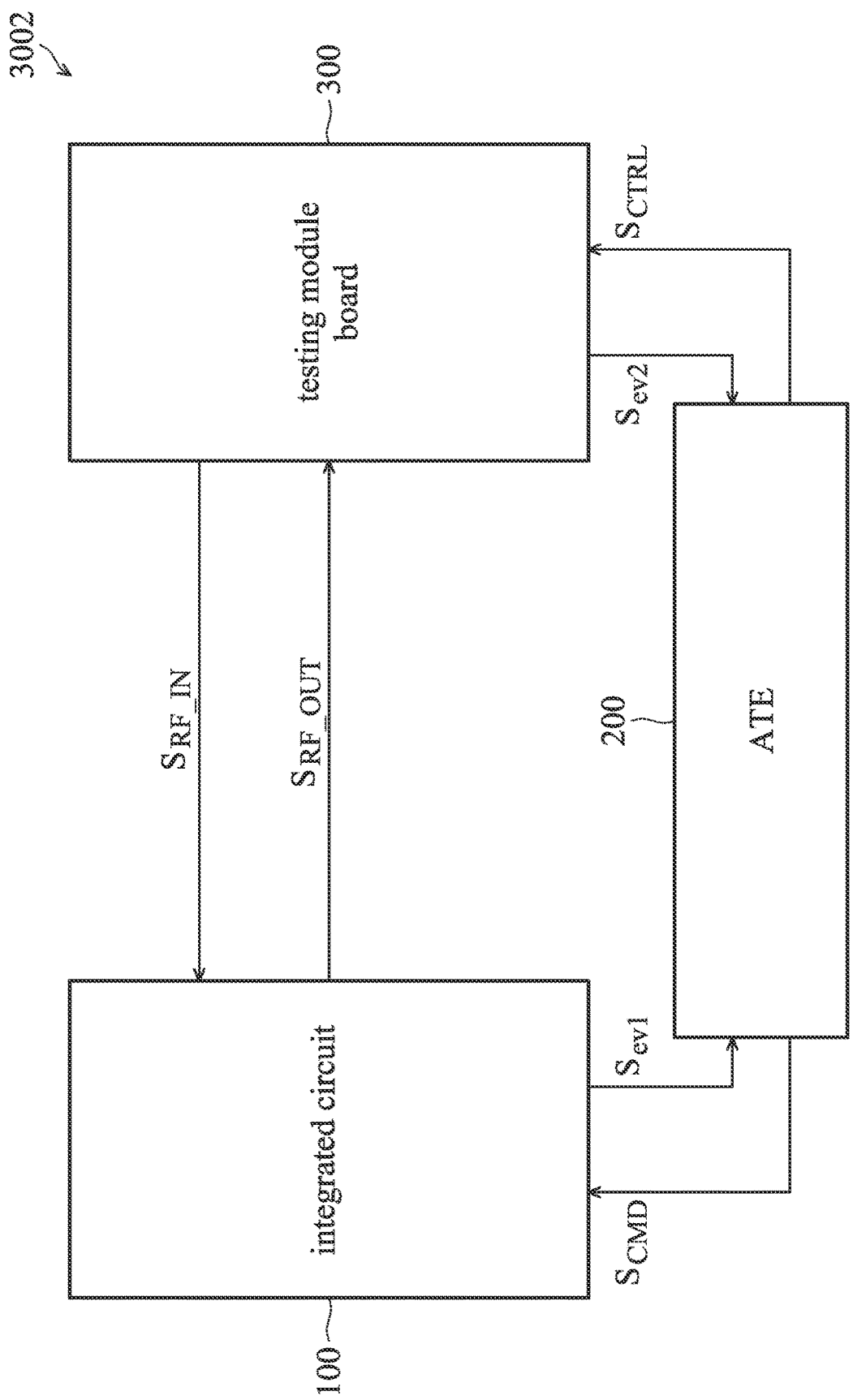
FIG. 2 is a simplified schematic block diagram of an RF testing system 3002 according to an embodiment of the invention.

FIG. 2 is a simplified schematic block diagram of an RF testing system 3002 according to an embodiment of the invention. As illustrated in FIG. 2, the RF testing system 3002 may comprise an IC 100, ATE 200, and a testing module board (e.g. a module circuitry) 300. The ATE 200 initializes a test process by sending a command signal $S_{CMD}$ to the IC 100. In response, the IC 100 is arranged to enter into a test mode, and, in contrast to the ATE 200 controlling the test process in the conventional approach, the IC 100 takes control of the test operations. However, this is for illustrative purpose rather than a limitation of the present invention. In other embodiments (which will be illustrated later), the test process control may take place in the testing module board 300, where the ATE 200 send the command signal $S_{CMD}$ to the testing module board 300, and the testing module board 300 then sends a control signal to the IC 100 accordingly. Or, the ATE 200 may be equipped with the test process controlling. Moreover, the test process aims to locate defective build elements in mixed-mode circuitry or analog circuitry in the IC 100. Under the test mode, the IC 100 communicates with the testing module board 300 using RF signals or analog signals. For example, the IC 100 may transmit the RF signals $S_{RF\_OUT}$ to the testing module board 300 for transmission-performance evaluation or receive RF signals $S_{RF\_IN}$ from the testing module board 300, which is generated by the testing module board 300 itself or the IC 100 itself and passing through the testing module board 300 using an external loopback path, to evaluate the reception performance of the IC 100 (details will be described later). The output signals $S_{ev1}$ may be an evaluation signal which is low-frequency (e.g., baseband, close to zero) produced and sent by the IC 100 to the ATE 200 for a test analysis. Similarly, the output signals $S_{ev2}$ may be an evaluation signal which is low-frequency (e.g., baseband, close to zero) produced and sent by the testing module board 300 to the ATE 200 for a test analysis. The testing module board 300, which is external to the IC 100 and ATE 200, comprises discrete components to assist signal property analysis as well as RF testing signal generation and receive a control signal $S_{CTRL}$ from the ATE 200 in the test mode. In this way, the ATE 200 does not need to process high-frequency (e.g. radio frequency) signals, and therefore the cost can be reduced. As the test analysis is performed by the ATE 200, the DUT is not necessarily equipped with a digital signal processor, that is, the IC 100 can be a system-on-chip (SOC) circuit or a stand-alone RF IC. In the following sections, different test configurations will be described.

Figure 3:
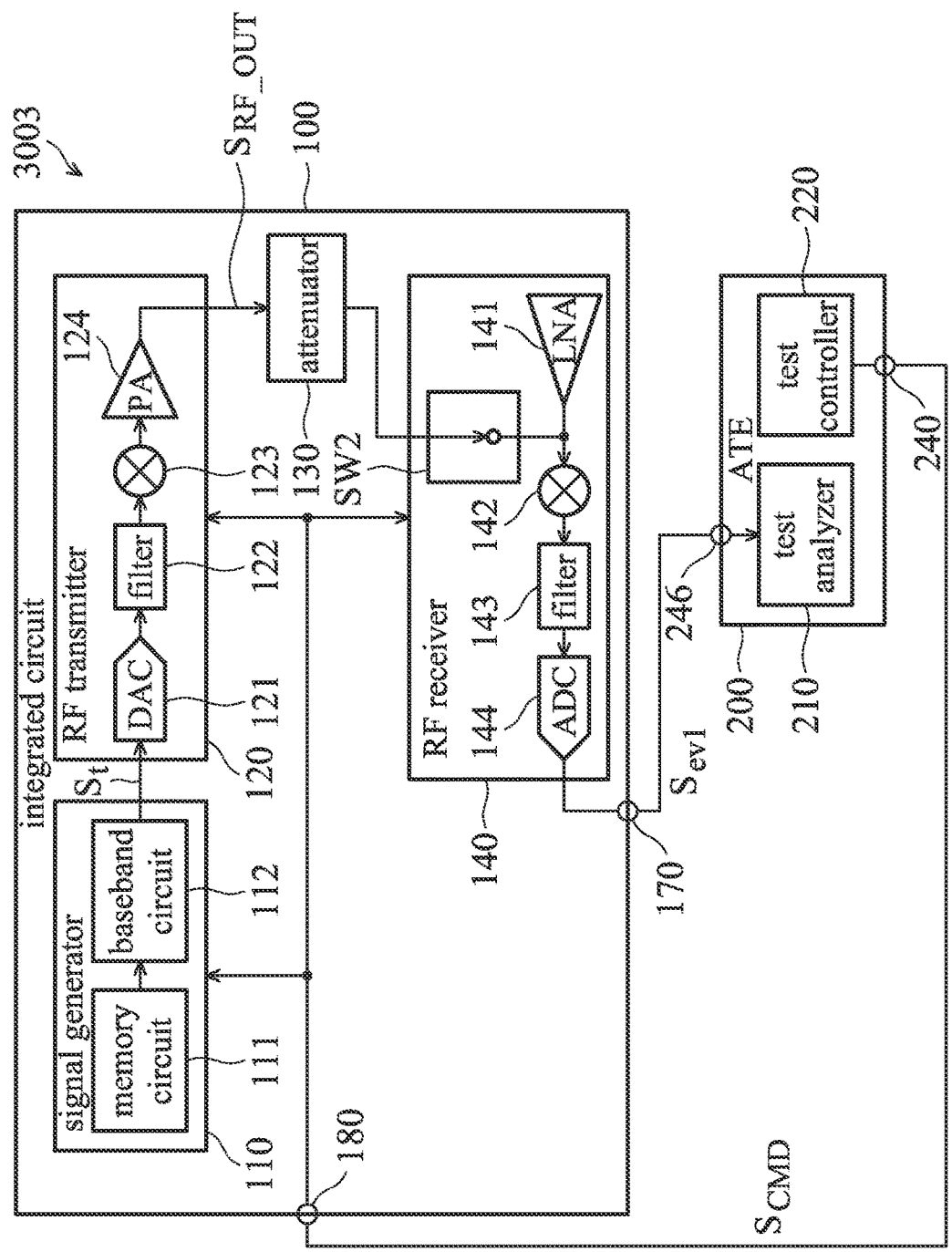
FIG. 3 is a detailed schematic block diagram of an RF testing system 3003 according to an embodiment of the invention.

FIG. 3 is a detailed schematic block diagram of the RF testing system 3003 according to an embodiment of the invention. The RF testing system 3003 may comprise an IC 100 and ATE 200. For example, the IC 100 may be a system-on-chip (SOC) or a stand-alone RF IC having digital-to-analog converters (DAC) and analog-to-digital converters (ADC). As illustrated in FIG. 3, the IC 100 comprises a signal generator 110, an RF transmitter 120, an attenuator 130, an RF receiver 140, and communication ports 170, 180. The RF transmitter 120 and the RF receiver 140 may belong to the same or different transceiver systems. For examples, the transmitter 120 and the receiver 140 may both belong to a WLAN system, or they may respectively belong to a WLAN system and a Bluetooth system. In some implementations, the signal generator 110 comprises a memory circuit 111 that keeps various test patterns for the RF test process therein, and a baseband circuit 112 that performs digital power control (not shown) and/or digital compensations (not shown) such as in-phase/quadrature (IQ) mismatch and digital pre-distortion. The RF transmitter 120 comprises a DAC 121, a filter circuit 122, a modulator 123, and a power amplifier (PA) 124. Similarly, the RF receiver 140 comprises a demodulator 142, a filter 143, and an ADC 144. The modulator 123 and demodulator 142 may further receive carrier signals from one or more local oscillators (not shown) to modulate and demodulate the outgoing and incoming RF signals, respectively. In this internal loopback configuration, the communication port 170 outputs an evaluation signal $S_{ev1}$ generated by the RF receiver 140 to the ATE 200.

As illustrated in FIG. 3, the ATE 200 may comprise a test analyzer 210, a test controller 220, and communication ports 240, 246. The test controller 220 of the ATE 200 directs the command signal $S_{CMD}$ through the communication ports 240 and 180 to components of the IC 100, thereby controlling components of the IC 100 to perform the RF test process. In response, the IC 100 enters a test mode and generates a test pattern signal $S_t$ internally. The test pattern $S_t$ is sent to the RF transmitter 120 to undergo various analog circuits passing in the transmitter path, rendering an outgoing RF signal $S_{RF\_OUT}$, which is further sent to the RF receiver 140 through the internal attenuator 130. The test analyzer 210 can be used to measure power at frequency associated with wanted tone, image tone or second-order or third-order harmonics to test transmitter/receiver gain, image rejection ratio (IRR), input second intercept point (IIP2), input third intercept point (IIP3), etc. In the test analyzer 210, we can implement a noise-power estimator to calculate noise power or signal-to-noise ratio (SNR) of the receiver for the NF test. The lock-time measure can also be implemented by software or hardware in the test analyzer 210 to test the lock time of a phase-locked loop (PLL), which comprises the instantaneous frequency estimation, lock-time calculation using the information of the frequency estimates, and pass/fail decision. Some estimators of modulated tests such as error vector magnitude (EVM) and spectrum estimators can also be implemented in the test analyzer 210 to evaluate the quality of the RF transmitter 120.

Specifically, in the internal loopback configuration, the outgoing RF signal $S_{RF\_OUT}$ is transferred to the demodulator 142 of the RF receiver 140 through the attenuator 130 to undergo RF impairments in a receiver path, outputting a first baseband evaluation signal $S_{ev1}$ through the communication port 170 to the test analyzer 210 of the ATE 200 for test analysis.

Figure 4:
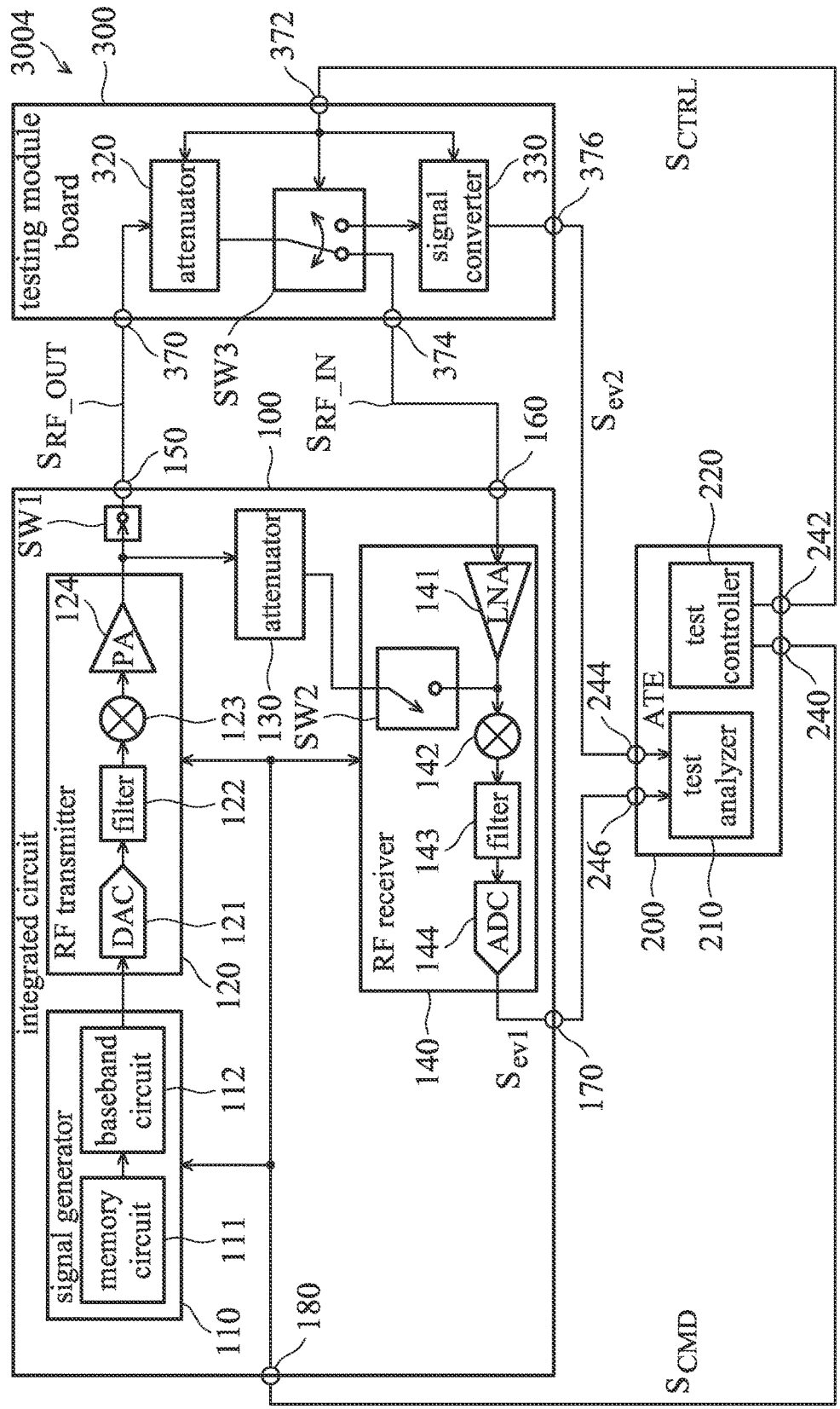
FIG. 4 is a detailed schematic block diagram of the RF testing system 3004 according to another embodiment of the invention.

FIG. 4 is a detailed schematic block diagram of the RF testing system 3004 according to another embodiment of the invention. The circuit configuration is similar to that in FIG. 3 except that the testing module board 300 is connected to the IC 100 and a low noise amplifier (LNA) 141 and switches SW1, SW2 are involved. The input of the demodulator 142 can be from the internal attenuator 130 or from the LNA 141 when the internal loopback path or the external loopback path is selected, respectively (details will be described later). When the internal loop-back path is selected (corresponding to FIG. 3), the switch SW1 is opened and the switch SW2 is closed, so that the outgoing RF signal $S_{RF\_OUT}$ is looped back through the internal attenuator 130 between the output of the RF transmitter 120 and the input of the RF receiver 140, such that the signal performance of the RF transmitter 120 and RF receiver 140 can be evaluated without the use of the external testing module board 300. In the embodiment of FIG. 4, the external loopback configuration is selected. In response, the switch SW1 is closed and the switch SW2 is opened. In addition, the test controller 220 of the ATE 200 further directs the control signal $S_{CTRL}$ through the communication ports 242, 372 to control the testing module board 300, and the communication port 160 of the IC 100 acquires the incoming RF signal $S_{RF\_IN}$ from the testing module board 300.

As illustrated in FIG. 4, the testing module board 300, which is external to the IC 100 and the ATE 200, may comprise an input port 370, a loopback port 374, a control port 372, an output port 376, an adjustable attenuator 320, a switch SW3, and a signal converter 330. In some implementations, a testing load board (not shown) is provided to hold the testing module board 300 and the IC 100 together. The testing load board may comprise an IC socket (not shown) to accept the IC 100 and a module slot (not shown) to hold the testing module board 300 in place during the test. The input port 370 accepts the response RF signal $S_{RF\_OUT}$ from the IC 100. The control port 372 receives the control signal $S_{CTRL}$ from the test controller 220 of the ATE 200 to enable the testing module board 300 to work under the test mode. The control signal $S_{CTRL}$ controls the attenuator 320 and switching of the switch SW3. Specifically, the attenuator 320 receives controls via the control signal $S_{CTRL}$ to adjust the attenuation level to the RF signal $S_{RF\_OUT}$. The switch SW3 is selected by the control signal $S_{CTRL}$ to switch between the signal converter configuration (i.e. through the signal converter 330) and the external loopback configuration (i.e. through the loopback port 374). In the external loopback configuration, the switch SW3 is switched to the loopback port 374, the outgoing RF signal $S_{RF\_OUT}$ from the RF transmitter 120 is attenuated by the attenuator 320 of the testing module board 300, and then output to the LNA 141 of the RF receiver 140 through the loopback port 374 to undergo RF impairments in a receiver path. In other words, the RF transmitter output signal $S_{RF\_OUT}$ is looped back through the attenuator 320 as an input RF signal $S_{RF\_IN}$ to the RF receiver 140 for a further test in the receiver path. In the RF receiver 140, the input RF signal $S_{RF\_IN}$ is downconverted into the baseband, which is digitized into digital words regarded as the evaluation signal $S_{ev1}$ sent to the test analyzer 210 of the ATE 200 for test analysis.

Figure 5B:
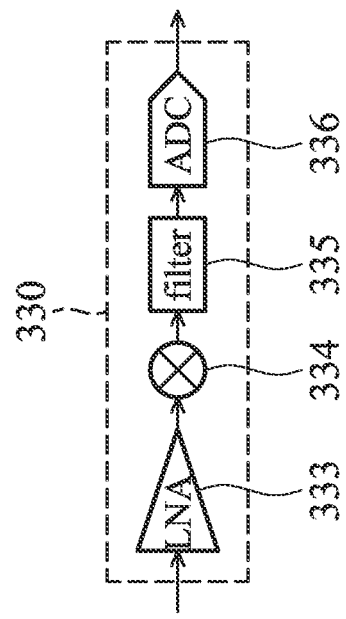
FIGS. 5A-5B are schematic block diagrams of the signal converter 330 according to different embodiments of the invention.
Figure 5A:
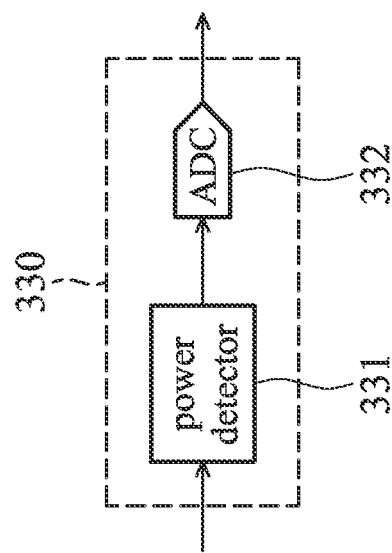
Figure 6:
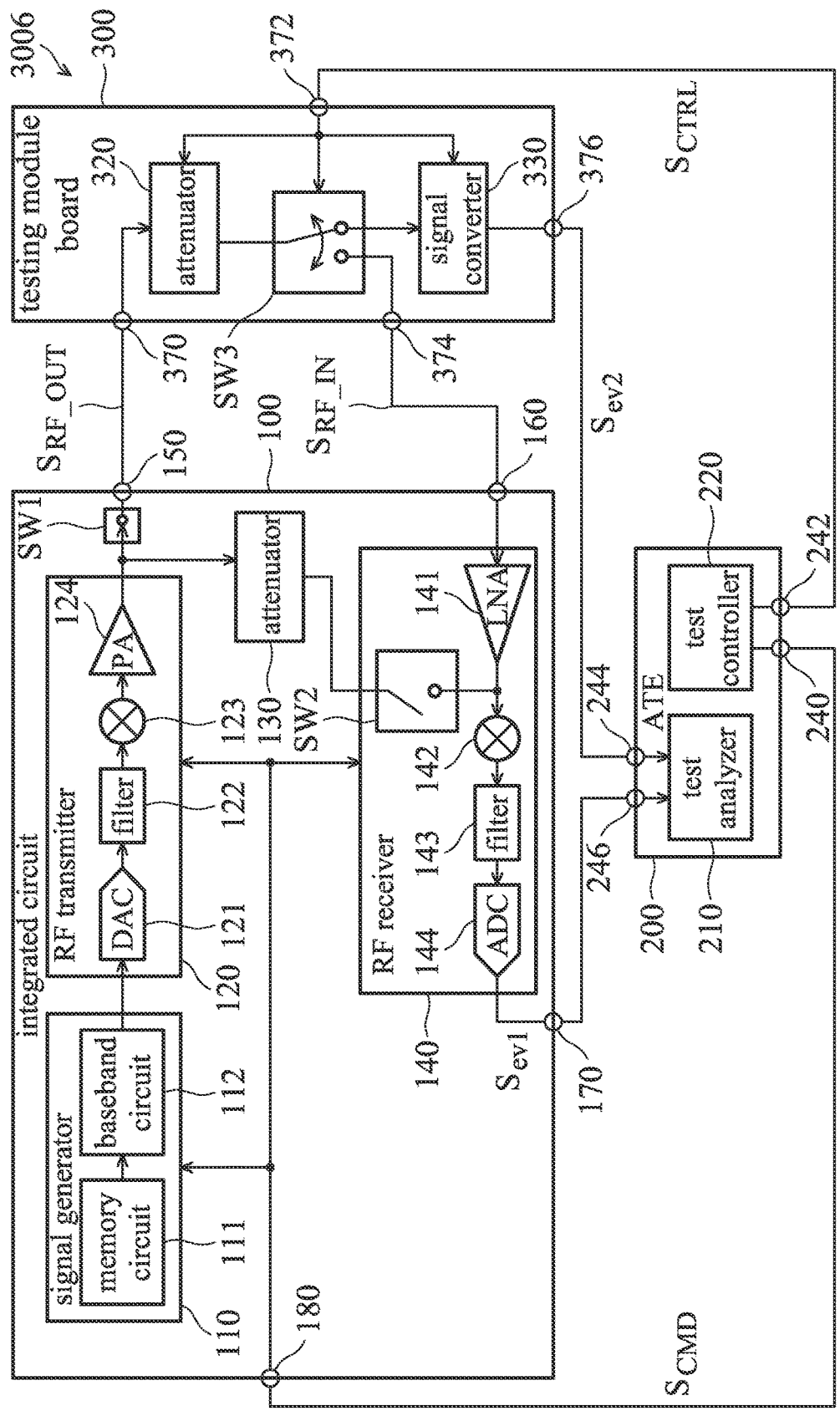
FIG. 6 is a detailed schematic block diagram of the RF testing system 3006 according to yet another embodiment of the invention.

In the signal converter configuration, as shown in FIG. 6, the switch SW3 is switched to the signal converter 330, the outgoing RF signal $S_{RF\_OUT}$ from the RF transmitter 120 is attenuated by the attenuator 320 of the testing module board 300, and then converted by the signal converter 330. In other words, the RF transmitter output signal $S_{RF\_OUT}$ is not looped back to the IC 100, but processed by the testing module board 300 to generate the evaluation signal $S_{ev2}$ sent to the test analyzer 210 of the ATE 200 through ports 374 and 244 for test analysis. FIGS. 5A-5B are schematic block diagrams of the signal converter 330 according to different embodiments of the invention. The signal converter 330 may be implemented in different circuits, thereby converting RF signals into analog/digital signals. For example, the signal converter 330 may comprise a power detector 331 and an ADC 332, as illustrated in FIG. 5A. Alternatively, the signal converter 330 may have similar components, such as an LNA 333, a demodulator 334, a filter 335, and an ADC 336, as those in the RF receiver 140, as illustrated in FIG. 5B. It should be noted that the invention is not limited to the aforementioned implementations of the signal converter 330. For those skilled in the art, it is appreciated that a reference RF receiver can be implemented in various circuits, and the details will not be described here.

It should be noted that the evaluation signals $S_{ev1}$ and $S_{ev2}$ may be in analog or digital form. In some implementations, the RF transmitter 120 and the RF receiver 140 do not have DAC/ADC circuits, and the test analyzer 210 may further comprise a digitizer (not shown) to convert the incoming analog evaluation signals into digital signals, thereby performing digital signal analysis of the RF test process.

In comparison to conventional RF test mechanisms, the present embodiment depicts an RF testing system where signal received/transmitted by the ATE 200 is only low-frequency signals. Only low-frequency command signal $S_{CMD}$ and evaluation signals $S_{ev1}$ are exchanged between the IC 100 and the ATE 200. In addition, only low-frequency control signal $S_{CTRL}$ and evaluation signals $S_{ev2}$ are exchanged between the testing module board 300 and the ATE 200. It should be noted that high-speed communication is only between the IC 100 and the testing module board 300. This leads to a reduction in the circuit complexity of the ATE 200, thereby decreasing design and manufacturing cost.

In view of the above, three configurations, which are the internal loopback configuration, the external loopback configuration, and the signal converter configuration, are provided to test the transmission performance of the IC 100. Upon receiving the evaluation signal $S_{ev1}$ or $S_{ev2}$, a test analysis of the transmission performance of the IC 100 can be performed by the test analyzer 210 of the ATE 200. For example, the transmitter path is usually tested at the system level test by the EVM and spectrum, nonlinearity tests such as IIP2 and IIP3, an image signal test, a carrier leakage test, and a transmission power test.

Figure 7:
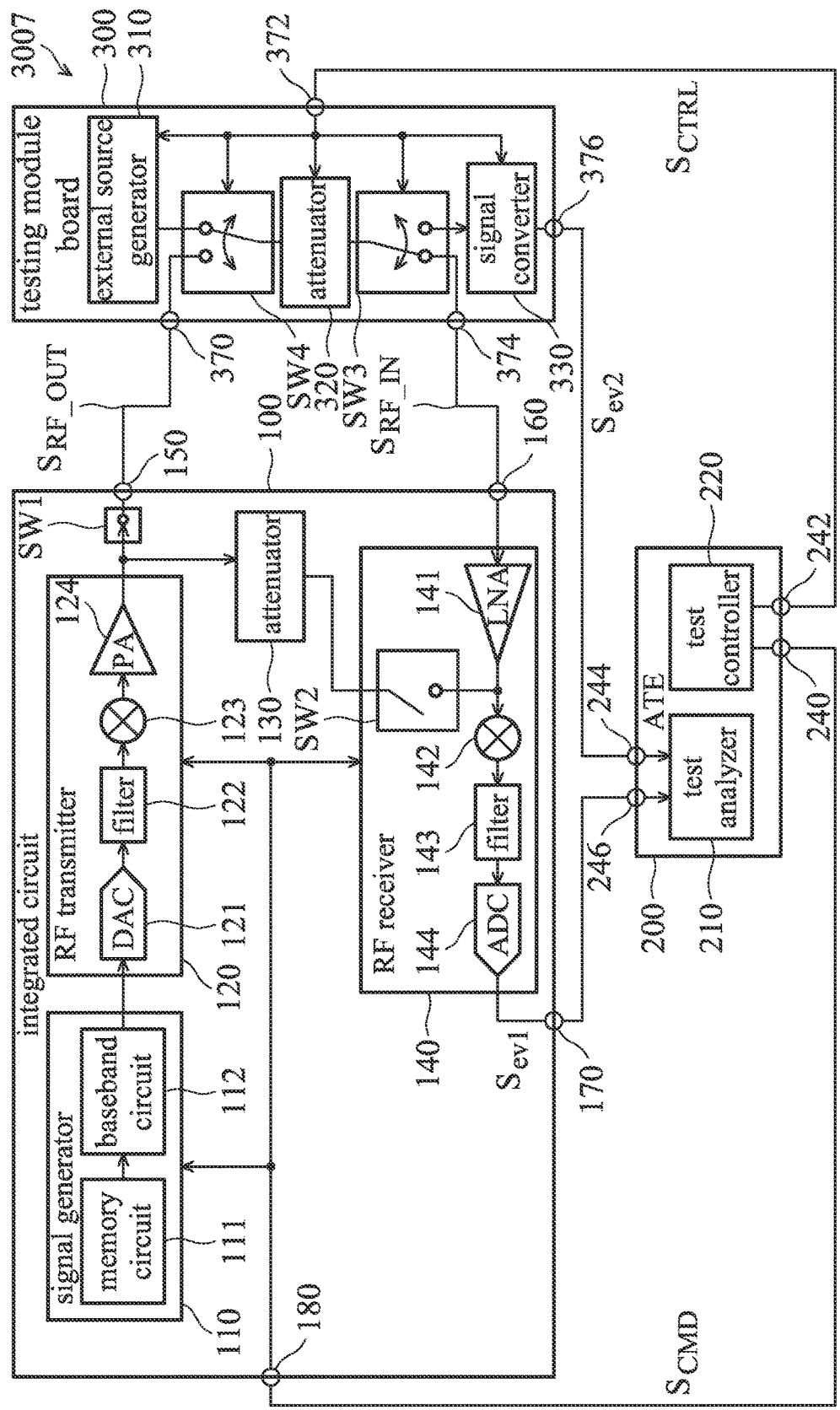
FIG. 7 is a detailed schematic block diagram of the RF testing system 3007 according to still yet another embodiment of the invention.

FIG. 7 is a detailed schematic block diagram of the RF testing system 3007 according to still yet another embodiment of the invention. The circuit configuration and connection is similar to those in the RF testing system 3006, except that in the RF testing system 3007, an external source generator 310 and a switch SW4 are placed at the testing module board 300 for further performing Rx test process. The switch SW4 is controlled by the control signal $S_{CTRL}$ to switch between the incoming RF signals from the RF transmitter 120 or from the external source generator 310. Specifically, referring to FIG. 7, upon receiving the control signal $S_{CTRL}$ indicating initiation of an RF Rx test process, the external source generator 310 may start to generate the single-tone, two-tone, and modulation signals required in the RF Rx test process. Meanwhile, the switch SW4 is switched to the external source generator 310 and the switch SW3 is switched to the communication port 374. In response, the generated signals from the external source generator 310 are fed into the attenuator 320, and then the attenuated RF signals are transmitted to the LNA 141 of the RF receiver 140 via the communication port 374, thereby evaluating the reception performance of the IC 100 in the receiver path at the test analyzer 210. Similarly, the RF receiver 140 may output the first evaluation signal $S_{ev1}$ through the communication port 170 to the test analyzer 210 of the ATE 200 for test analysis. Upon receiving the evaluation signal $S_{ev1}$, a test analysis of the reception performance of the IC 100 can be performed by the test analyzer 210 of the ATE 200. For example, the evaluated characteristics for the receiver path comprise a receiver gain test, an image signal test, a DC offset test, an NF test, and nonlinearity tests such as IIP2 and IIP3.

Figure 8C:
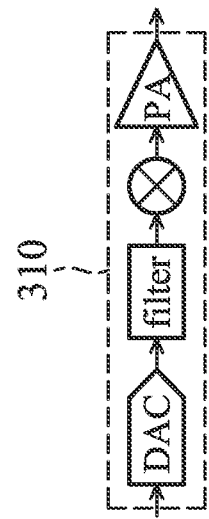
FIG. 8A~8C are block diagrams of the external source generator 310 according to different embodiments of the invention.
Figure 8B:
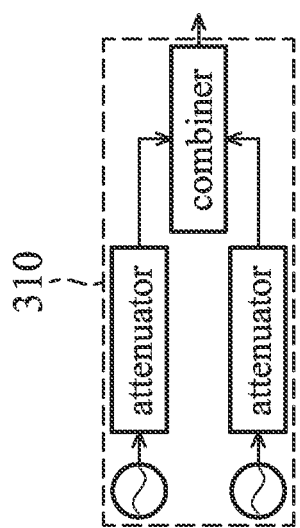
Figure 8A:
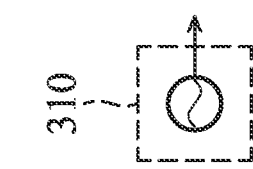

FIG. 8A~8C are block diagrams of the external source generator 310 according to different embodiments of the invention. For example, the external source generator 310 may be a single-tone generator, a dual-tone generator, and/or a reference RF transmitter, as illustrated in FIGS. 8A, 8B and 8C, respectively. The DAC in FIG. 8C may be coupled to a test pattern generator not shown, or receive test pattern from the ATE 200. Implementations of the signal-tone generator, dual-tone generator, and the reference RF transmitter are well-known to those skilled in the art, and the details will not be described here.

Figure 9:
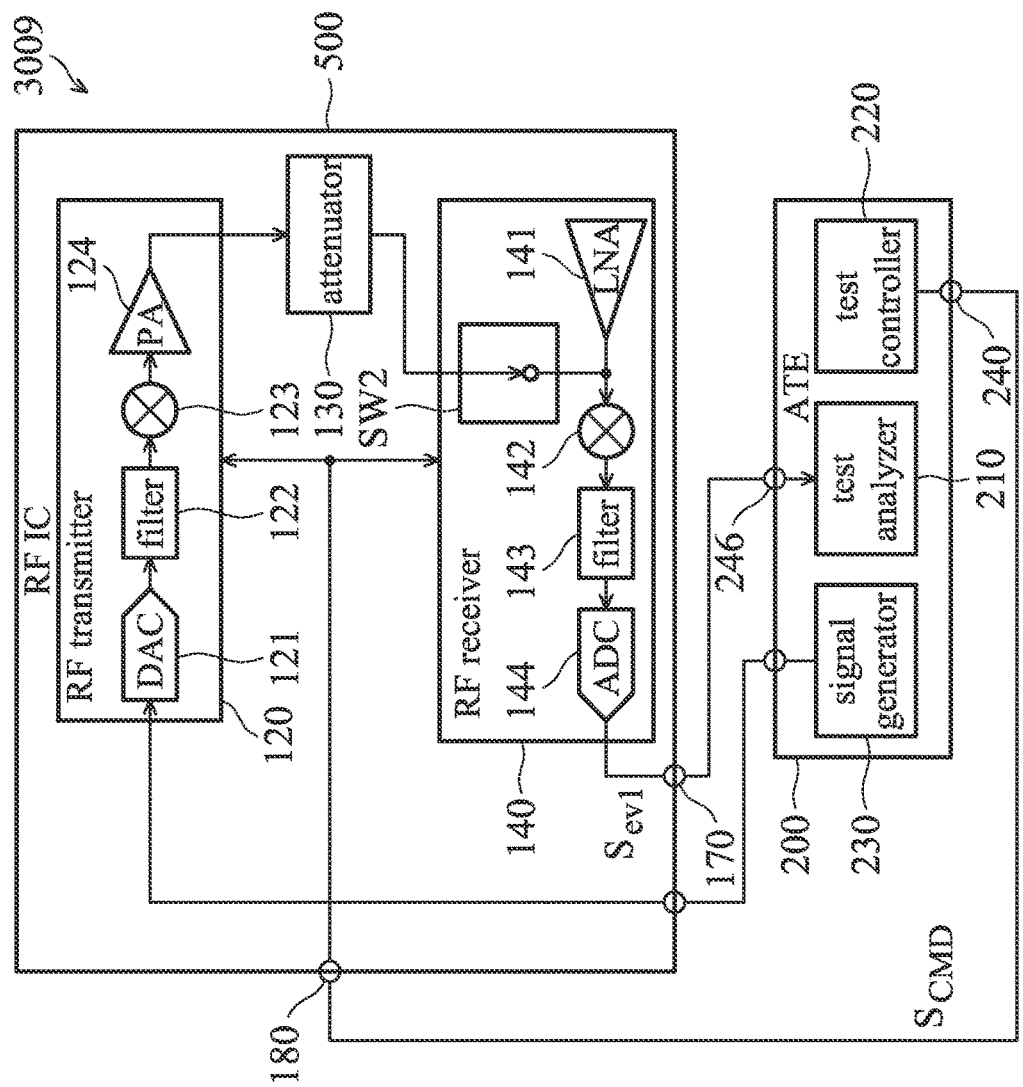
FIG. 9 is a schematic block diagram of an RF testing system 3009 according to an embodiment of the invention.

FIG. 9 is a schematic block diagram of an RF testing system 3009 according to an embodiment of the invention. In the RF testing system 3009, the IC 500 may be a stand-alone RF IC without a signal generator. Accordingly, the function of the signal generator is moved to the ATE 200. In other words, the test controller 220 may control the signal generator 230 internally, thereby transmitting predefined RF test patterns to the RF transmitter 120. The circuit configuration and connection of the remaining components in the RF testing system 3009 are similar to those in the RF testing system 3003, and the details can be referred to in the aforementioned embodiments of FIG. 3. Similar to the embodiment of FIG. 3, the internal loopback configuration is also selected in the RF testing system 3009. Specifically, the RF transmitter 120 receives the external RF test pattern signals from the signal generator 230 of the ATE 200. Then, the outgoing RF signal generated by the RF transmitter 120 may be internally fed back to the RF receiver 140 through the internal attenuator 130. In addition, the evaluation signal $S_{ev1}$ output by the RF receiver 140 can be fed into the test analyzer 210 for test analysis.

Figure 10:
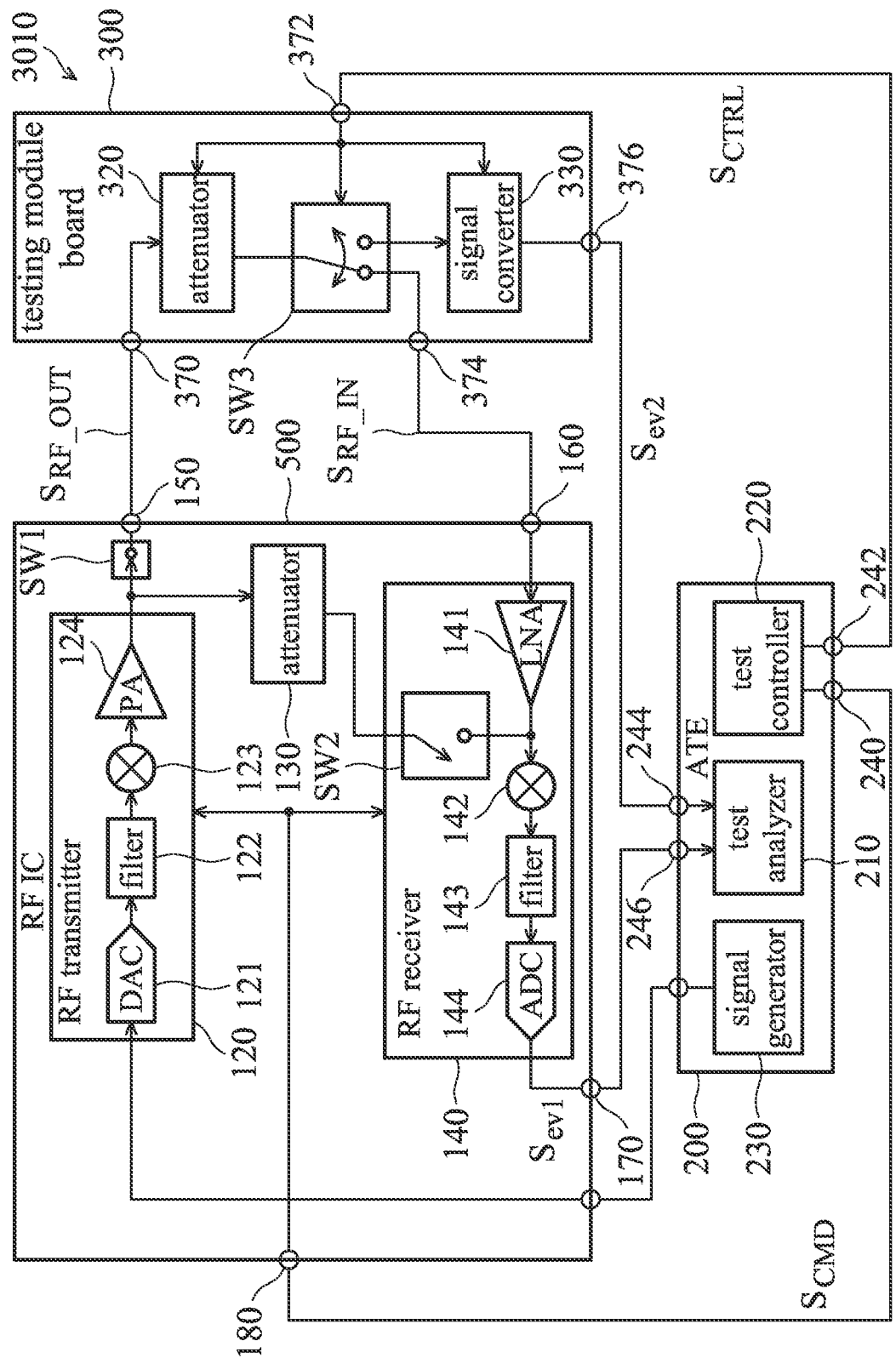
FIG. 10 is a schematic block diagram of an RF testing system 3010 according to another embodiment of the invention.

FIG. 10 is a schematic block diagram of an RF testing system 3010 according to another embodiment of the invention. In the RF testing system 3010, the IC 500 may be a stand-alone RF IC without a signal generator. Accordingly, the function of the signal generator is moved to the ATE 200. In other words, the test controller 220 may control the signal generator 230 internally, thereby transmitting predefined RF test patterns to the RF transmitter 120. The circuit configuration and connection of the remaining components in the RF testing system 3010 are similar to those in the RF testing system 3004, and the details can be referred to in the aforementioned embodiments of FIG. 4. Similar to the embodiment of FIG. 4, the external loopback configuration is also selected in the RF testing system 3010. Specifically, the RF transmitter 120 receives the external RF test pattern signals from the signal generator 230 of the ATE 200 and generates the outgoing RF test signal $S_{RF\_OUT}$. Then, the outgoing RF test signal $S_{RF\_OUT}$ from the RF transmitter 120 is transmitted to the testing module board 300. The RF test signal $S_{RF\_OUT}$ is attenuated by the attenuator 320 in the testing module board 300, and the attenuated RF test signal is further fed back into the RF receiver 140 through the communication port 160. Subsequently, the evaluation signal $S_{ev1}$ output by the RF receiver 140 can be fed into the test analyzer 210 for test analysis.

Figure 11:
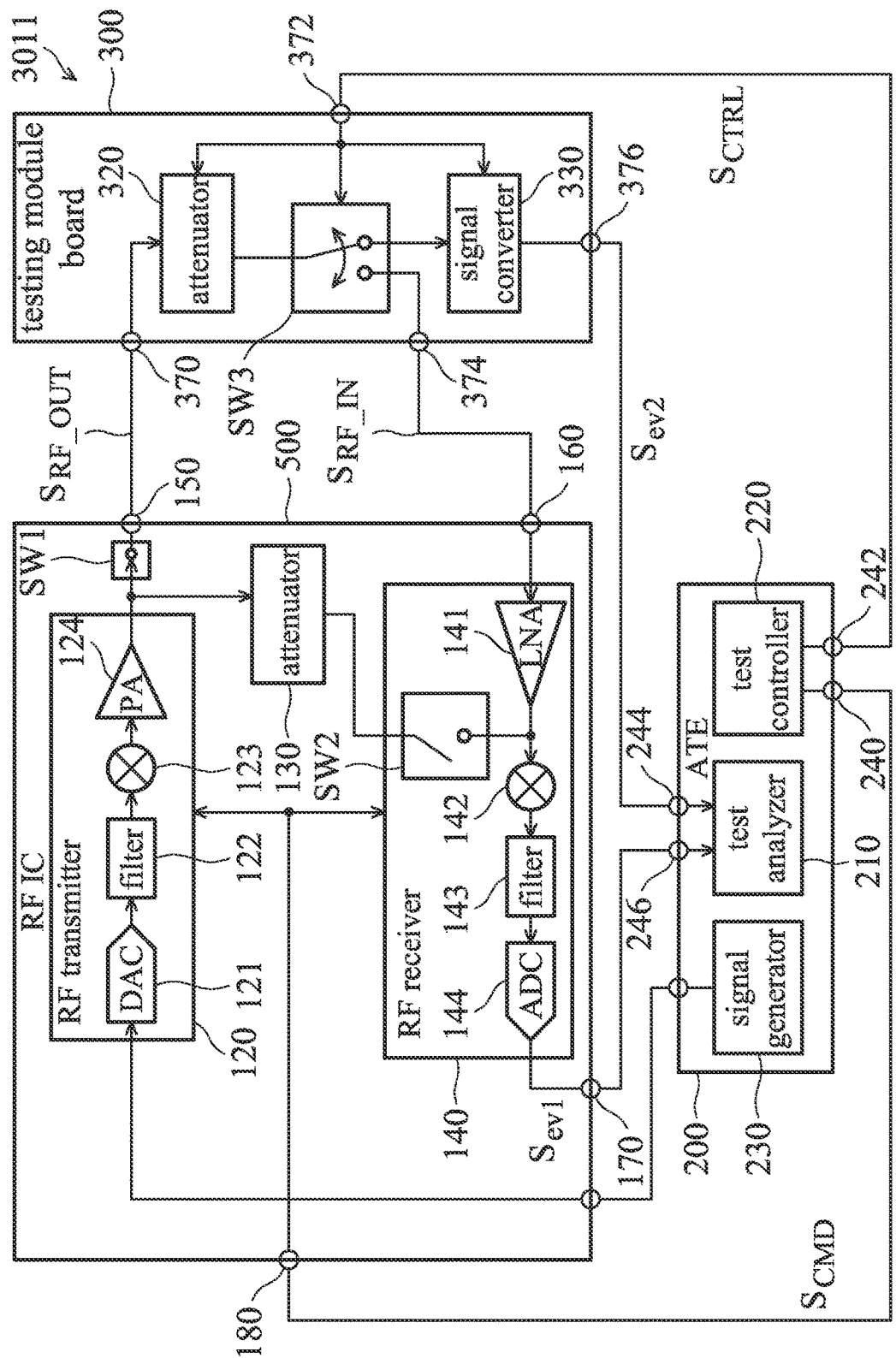
FIG. 11 is a schematic block diagram of an RF testing system 3011 according to yet another embodiment of the invention.

FIG. 11 is a schematic block diagram of an RF testing system 3011 according to yet another embodiment of the invention. In the RF testing system 3011, the IC 500 may be a stand-alone RF IC without a signal generator. Accordingly, the function of the signal generator is moved to the ATE 200. In other words, the test controller 220 may control the signal generator 230 internally, thereby transmitting predefined RF test patterns to the RF transmitter 120. The circuit configuration and connection of the remaining components in the RF testing system 3011 are similar to those in the RF testing system 3006, and the details can be referred to in the aforementioned embodiments of FIG. 6. Similar to the embodiment of FIG. 6, the signal converter configuration is also selected in the RF testing system 3011. Specifically, the RF transmitter 120 receives the external RF test pattern signals from the signal generator 230 of the ATE 200. Then, the outgoing RF test signal $S_{RF\_OUT}$ from the RF transmitter 120 is transmitted to the testing module board 300. The RF test signal $S_{RF\_OUT}$ is attenuated by the attenuator 320 in the testing module board 300, and the attenuated RF test signal is further fed into the signal converter 330 for signal conversion. Subsequently, a second evaluation signal $S_{ev2}$ is generated by the signal converter 330, and is further transmitted to the test analyzer 210 of the ATE 200 through the communication port 376.

Figure 12:
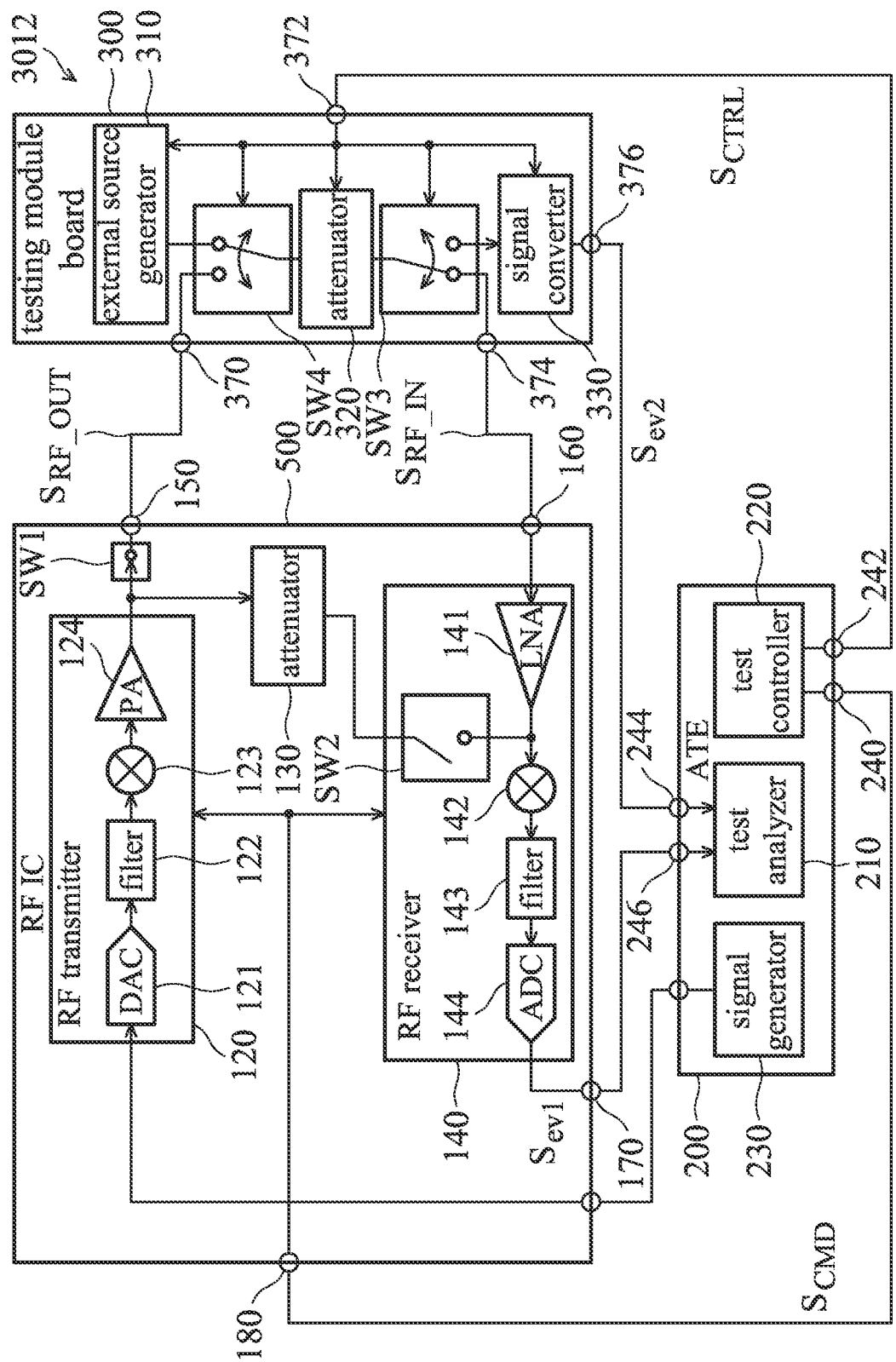
FIG. 12 is a schematic block diagram of an RF testing system 3012 according to still yet another embodiment of the invention.

FIG. 12 is a schematic block diagram of an RF testing system 3012 according to still yet another embodiment of the invention. In the RF testing system 3012, the IC 500 may be a stand-alone RF IC without a signal generator. The circuit configuration and connection of the components in the RF testing system 3012 are similar to those in the RF testing system 3007 except that the signal generator 230 has been moved to the ATE 200, and the details can be referred to in the aforementioned embodiments of FIG. 7. Similar to the RF testing system 3007, the testing module board 300 is controlled by the control signals $S_{CTRL}$ generated by the test controller 220 of the ATE 200. Specifically, upon receiving the control signal $S_{CTRL}$ indicating initiation of an RF Rx test process, the external source generator 310 may start to generate the single-tone, two-tone, and modulation signals required in the RF Rx test process. Meanwhile, the switch SW4 is switched to the external source generator 310 and the switch SW3 is switched to the communication port 374, so that the generated signals from the external source generator 310 may be fed into the attenuator 320, and then the attenuated RF signals can be transmitted to the LNA 141 of the RF receiver 140 via the communication port 374, thereby evaluating the reception performance of the IC 100 in the receiver path at the test analyzer 210. Similarly, the RF receiver 140 may output the first evaluation signal $S_{ev1}$ through the communication port 170 to the test analyzer 210 of the ATE 200 for test analysis. Upon receiving the evaluation signal $S_{ev1}$, a test analysis of the reception performance of the IC 100 can be performed by the test analyzer 210 of the ATE 200.

It should be noted that the evaluation signals $S_{ev1}$ and $S_{ev2}$ may be in analog or digital form. In some implementations, the above-mentioned RF transmitter and RF receiver do not have DAC/ADC circuits, and the test analyzer 210 may further comprise a digitizer (not shown) to convert the incoming analog evaluation signals into digital signals, thereby performing digital signal analysis of the RF test process.

Figure 13:
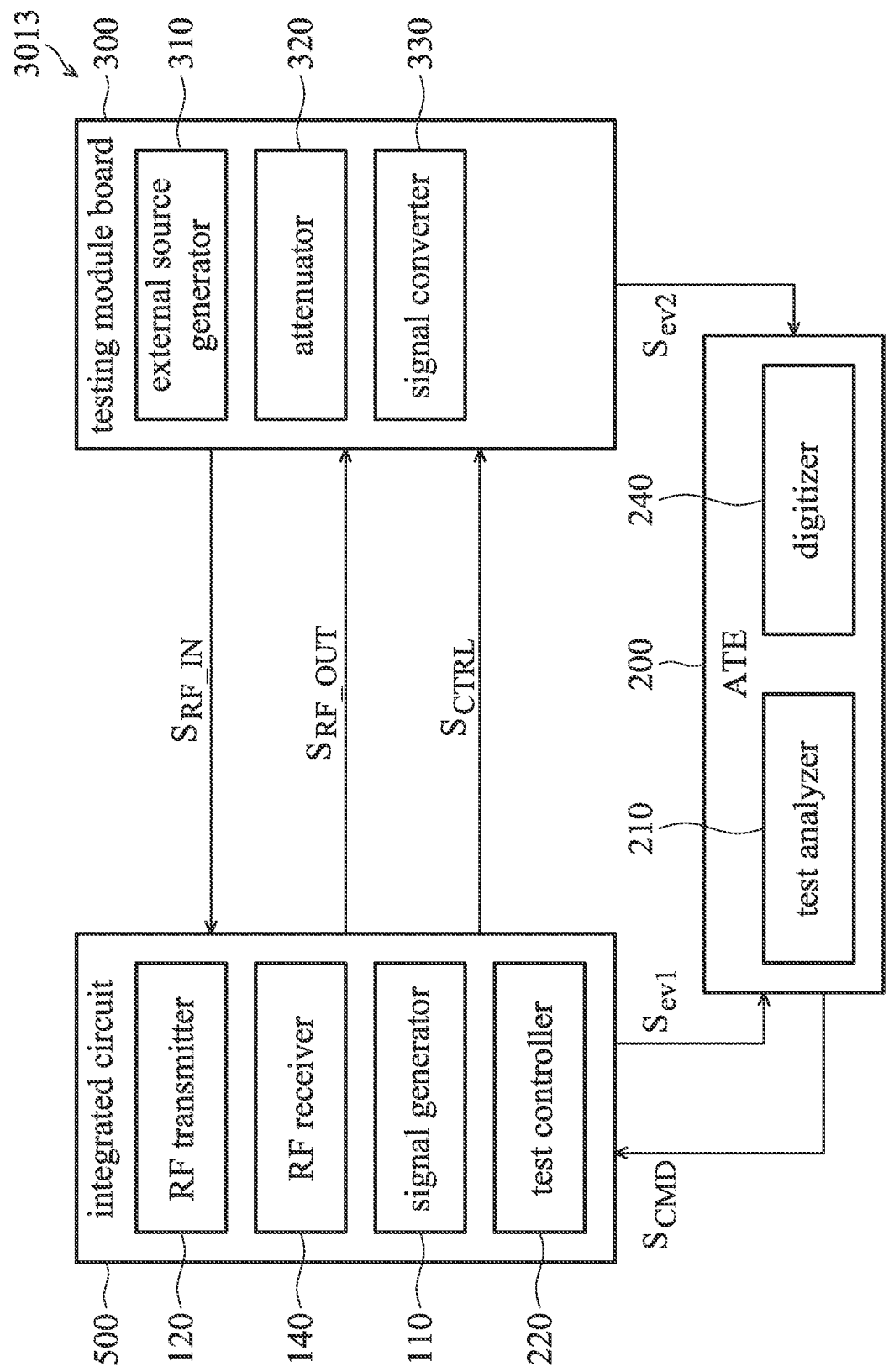
FIG. 13 is a schematic block diagram of an RF testing system 3013 according to still another embodiment of the invention.

FIG. 13 is a schematic block diagram of an RF testing system 3013 according to still another embodiment of the invention. In the RF testing system 3013, the IC 500 may be a SOC or a stand-alone RF IC having a test controller, and the circuit configuration and connection of the components in the RF testing system 3013 are similar to those in the RF testing system 3007 except that the test controller 220 has been moved to the IC 500. In the embodiment, the test analyzer 210 of the ATE 200 is capable of initiating an RF Tx or Rx test process by issuing a command signal (i.e. a digital signal) SCMD to the test controller 220 in the IC 500, and the test controller 220 in the IC 500 may send corresponding control signals SCTRL to the components in the IC 500 and the testing module board 300 in response to the command signal SCMD. It should be noted that different RF test configurations, which are previously described in the embodiments of FIGS. 3 to 12, can be used in the RF testing system 3013, and the details can be referred to in the embodiment of FIGS. 3 to 12. Specifically, the test analyzer 210 of the ATE 200 is still responsible for receiving the evaluation signal (i.e. a low-speed analog/digital signal) from either the RF receiver 140 or the signal converter 330 for digital signal analysis. When the evaluation signal from either the RF receiver 140 or the signal converter 330 is in an analog form, the digitizer 240 of the ATE 200 may convert the evaluation signal into digital signals before the test analysis is performed by the test analyzer 210.

Figure 14:
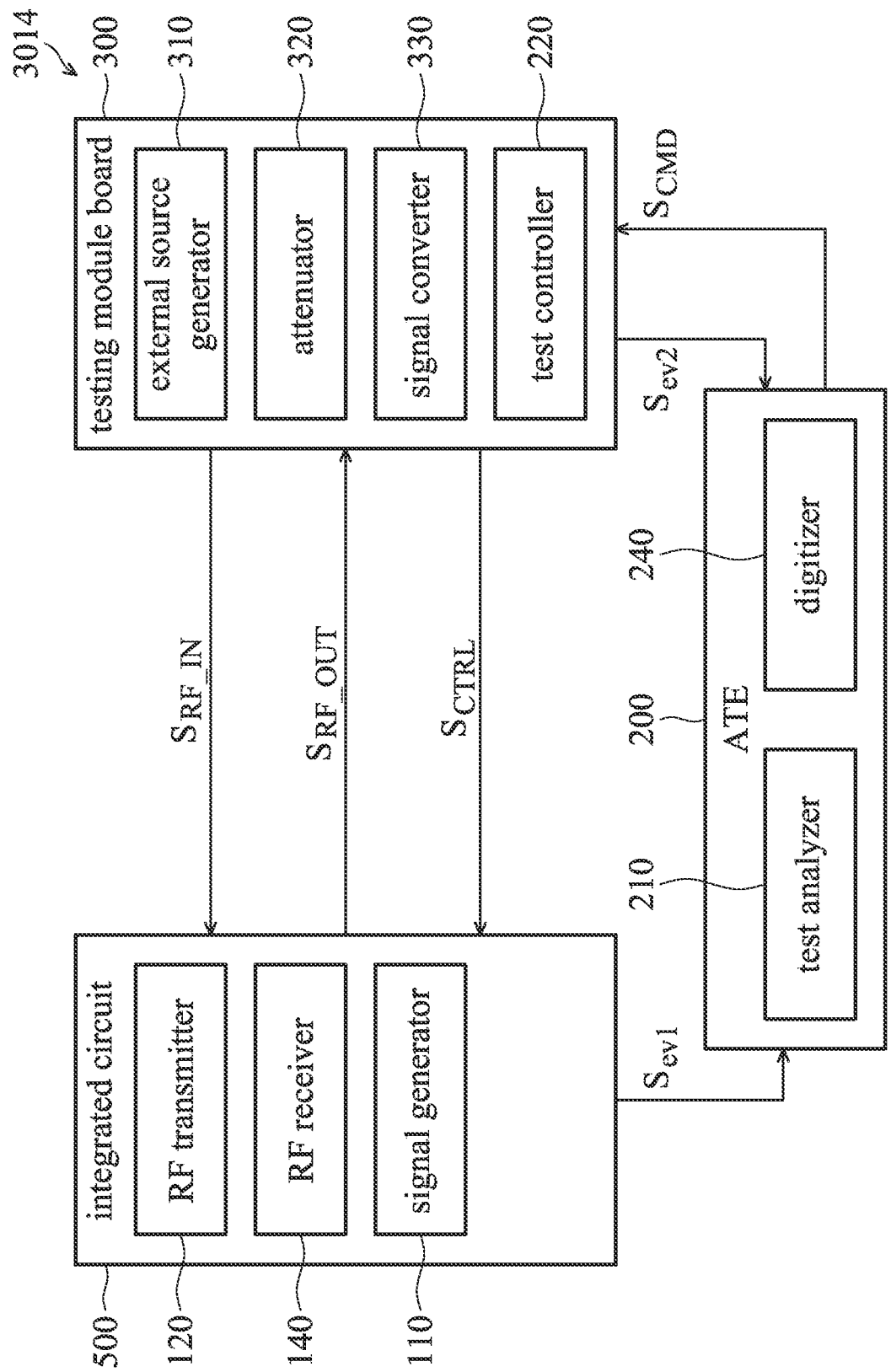
FIG. 14 is a schematic block diagram of an RF testing system 3014 according to still another embodiment of the invention.

FIG. 14 is a schematic block diagram of an RF testing system 3014 according to still another embodiment of the invention. In the RF testing system 3014, the IC 500 may be a SOC or a stand-alone RF IC, and the circuit configuration and connection of the components in the RF testing system 3014 are similar to those in the RF testing system 3007 except that the test controller 220 has been moved to the testing module board 300. In the embodiment, the ATE 200 is capable of initiating an RF Tx or Rx test process by issuing a command signal (i.e., a digital signal) SCMD to the test controller 220 in the testing module board 300, and the test controller 220 in the testing module board 300 may send the control signals SCTRL to the corresponding components in the IC 500 and the testing module board 300 in response to the command signal SCMD. It should be noted that different RF test configurations, which are previously described in the embodiments of FIGS. 3 to 12, can be used in the RF testing system 3013, and the details can be referred to in the embodiment of FIGS. 3 to 12. Specifically, the test analyzer 210 of the ATE 200 is still responsible for receiving the evaluation signal (i.e. a low-speed analog/digital signal) from either the RF receiver 140 or the signal converter 330 for digital signal analysis. When the evaluation signal from either the RF receiver 140 or the signal converter 330 is in analog form, the digitizer 240 of the ATE 200 may convert the evaluation signal into digital signals before the test analysis is performed by the test analyzer 210.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. An integrated circuit (IC), comprising
an RF transmitter configured to generate an RF signal in response to a command signal from test equipment; and
an RF receiver configured to generate an evaluation signal according to the RF signal, and report the evaluation signal to the test equipment, so that the test equipment performs a test analysis on the evaluation signal to determine a test result, wherein the test equipment is external to the IC; and wherein the RF transmitter is further configured to transmit the RF signal to a module circuitry external to the IC, and the RF receiver is further configured to receive an attenuated RF signal from the module circuitry and generate the evaluation signal accordingly.

2. The IC as claimed in claim 1, wherein the evaluation signal is indicative of an electrical characteristic of the RF signal.

3. The IC as claimed in claim 1, further comprising:
an internal attenuator configured to attenuate the RF signal from the RF transmitter; and
a signal generator configured to generate predefined RF test patterns in response to the command signal from the test equipment;
wherein the RF transmitter generates the RF signal in response to the generated RF test patterns, and the RF receiver converts the attenuated RF signal into the evaluation signal.

4. The IC as claimed in claim 1, wherein the command signal is used to initiate an RF test process.

5. The IC as claimed in claim 1, further comprising a test controller configured to control the RF transmitter and the RF receiver in response to the command signal from the test equipment.

6. The IC as claimed in claim 1, being a system-on-chip (SOC) or a stand-alone RF IC.

7. The IC as claimed in claim 1, wherein the RF transmitter receives test patterns from a signal generator external to the IC, and generates the RF signal in response to the received test patterns.

8. An integrated circuit (IC), comprising:
an RF transmitter configured to generate an RF signal in response to a command signal from test equipment, and transmits the RF signal to a module circuitry for performing signal conversion by the module circuitry to generate an evaluation signal, wherein the evaluation signal is reported to the test equipment, so that the test equipment performs a test analysis on the evaluation signal to determine a test result,
wherein the test equipment and the module circuitry are both external to the IC.

9. The IC as claimed in claim 8, wherein the evaluation signal is indicative of an electrical characteristic of the RF signal.

10. The IC as claimed in claim 8, further comprising:
a signal generator configured to generate predefined RF test patterns in response to the command signal from the test equipment;
wherein the RF transmitter generates the RF signal according to the generated RF test patterns from the signal generator.

11. The IC as claimed in claim 8, wherein the IC further comprises a test controller configured to control the RF transmitter and the module circuitry in response to the command signal from the test equipment.

12. The IC as claimed in claim 8, wherein the RF transmitter is further controlled by a test controller of the module circuitry in response to the command signal from the test equipment.

13. The IC as claimed in claim 8, wherein the RF transmitter receives test patterns from a signal generator external to the IC, and generates the RF signal according to the test patterns from the signal generator.

14. The IC as claimed in claim 8, being a system-on-chip (SOC) or a stand-alone RF IC.

15. An integrated circuit (IC), comprising:
an RF receiver configured to receives an RF signal from a module circuitry in response to a command signal from test equipment, generate an evaluation signal according to the received RF signal, and report the evaluation signal to the test equipment, so that the test equipment performs a test analysis on the evaluation signal to determine a test result,
wherein the module circuitry and the test equipment are both external to the IC.

16. The IC as claimed in claim 15, wherein the evaluation signal is indicative of an electrical characteristic of the RF signal.

17. The RF testing system as claimed in claim 15, wherein the RF signal received by the RF receiver is an attenuated version of an RF test signal generated by a source generator of the module circuitry.

18. The IC as claimed in claim 15, wherein the RF receiver is controlled by a test controller of the module circuitry in response to the command signal from the test equipment.

19. The IC as claimed in claim 15, further comprising a test controller configured to control the module circuitry in response to the command signal from the test equipment.

20. The IC as claimed in claim 15, being a system-on-chip (SOC) or a stand-alone RF IC.

21. Test equipment communicating with an integrated circuit (IC), comprising:
a control port configured to send a command signal for initiating a RF test process;
an input port configured to receive an evaluation signal indicative of an electrical characteristic of an RF signal of the IC, wherein the evaluation signal is a frequency-downconverted signal; and
a test analyzer configured to perform a test analysis on the evaluation signal to determine a test result,
wherein the test equipment does not transmit RF signals to the IC.

22. A radio frequency (RF) testing system, comprising:
test equipment;
a module circuitry; and
an integrated circuit (IC) configured to communicate with the module circuitry by an RF signal in response to a command signal from the test equipment, generate an evaluation signal by the RF signal, and report the evaluation signal to the test equipment, so that the test equipment performs a test analysis on the evaluation signal to determine the test result,
wherein the module circuitry is external to the IC and the test equipment.

23. A radio frequency (RF) testing system, comprising:
test equipment;
a module circuitry; and
an integrated circuit (IC) configured to communicate with the module circuitry by an RF signal in response to a command signal from the test equipment,
wherein the module circuitry generates an evaluation signal according to the RF signal from the IC, and reports the evaluation signal to the test equipment, so that the test equipment performs a test analysis on the evaluation signal to determine the test result,
wherein the module circuitry is external to the IC and the test equipment.

24. The RF testing system of claim 23, wherein the test equipment is not configured to process RF signals.

* * * * *